United States Patent [19]

Hutchinson et al.

[11] Patent Number: 4,475,764
[45] Date of Patent: Oct. 9, 1984

[54] AUTOMOBILE COVER

[76] Inventors: Mark R. Hutchinson, 208 W. Third St.; David A. Parker, 2224 Carter Rd., both of Owensboro, Ky. 42301

[21] Appl. No.: 469,087
[22] Filed: Feb. 23, 1983
[51] Int. Cl.³ .............................................. B60J 7/10
[52] U.S. Cl. .................................. 296/136; 296/218; 296/219
[58] Field of Search ...................... 296/95 C, 95 R, 98, 296/136, 100, 970, 176, 216, 218, 219; 160/368 S

[56] References Cited

U.S. PATENT DOCUMENTS 4,290,640  9/1981  Dalton ............................. 296/95 R
4,330,150  5/1982  Dunchock et al. ................. 296/219

FOREIGN PATENT DOCUMENTS 1960427  6/1971  Fed. Rep. of Germany .... 296/95 C

OTHER PUBLICATIONS

J. C. Whitney, Catalog No. 422D, Copyright 1982, p. 77, Item: Custom-Fit Rain Top.

Primary Examiner—Robert B. Reeves
Assistant Examiner—Dennis H. Pedder
Attorney, Agent, or Firm—Edward M. Steutermann

[57] ABSTRACT

A cover for the top of an automobile, having a front window, side windows, and a rear window surrounding a passenger compartment of the automobile and where the top of the automobile provides removable, self supporting covers carried by a frame assembly in the top of the automobile and where the edge of the frame adjoining the rear window of the automobile has a lip along a portion of the juncture between the removable covers and the frame where the cover provided by the present is a flexible sheet of material sized to cover the top of the automobile and the openings and includes a front flap at one edge of the cover to extend downwardly over the windshield, opposed side flaps to encroach over the side windows, and a rear edge carrying a flexible, compressible, generally circular cross section seal member, and strap means connected to the rear edge of the cover and extending outwardly therefrom and further where suction cup devices are provided on the side flaps to be secured to the side windows of the automobile, the front flap includes suction cup members to be secured to the windshield of the automobile and the straps include suction cups adjacent the terminal ends thereof to be secured to the rear window so that the cover can be pulled tightly toward the rear of the automobile to form a seal between the circular member and the ledge.

4 Claims, 5 Drawing Figures

AUTOMOBILE COVER

BACKGROUND OF THE INVENTION

The present invention pertains to temporary cover devices for automobiles and particularly automobiles of the type generally designated as having "T Tops".

"T Top" automobiles were developed as an alternative to convertable automobiles and generally provide a "T" frame assembly in the top where self-supporting removable covers are provided to be received within the "T" frame so that the removable tops are located above the passenger compartment of the automobile and so that upon removal of the "T" tops an open environment is presented to the operator and passengers in the automobile. The removable panels are generally stored in a storage compartment within the automobile so that in the event of a change in weather the tops can be reinserted to provide protection from the elements.

However, when the automobile is operated without the covers in place and is parked for a considerable amount of time the automobile is open, and subject to damage by the elements, including rain, snow and even the ultraviolet rays of the sun. Accordingly, where the automobile operator desires to protect the interior of the automobile it has heretofore been necessary to replace the removable panels during periods when the automobile is parked, for example during the day when the operator is at work. The replacement of the top is, in many cases, inconvenient in view of the time that is consumed in the replacement and removal of the tops and to some persons the replacement and removal of the tops is inconvenient for other reasons.

No prior art device is known to provide a cover for automobiles of the aforenoted characteristics where the covering is temporary, is easily removed yet provides adequate protection for the interior of the automobile during periods when the automobile is parked and is to be utilized for a relatively short period of time.

The prior art includes U.S. Pat. No. 4,290,640—Dalton, which describes a cover for "T" top automobiles which is permanent in that it is utilized when the automobile is in operation. The purpose of the structure of the Dalton reference is to prevent leakage through the joints between the removable covers and the "T" frame during periods when the automobile is in operation and, contrary to the present invention, the cover is utilized with, and depends upon, the removable covers being in place on the automobile. The structure of the Dalton reference provides snap means which must be installed on the automobile to secure the removable cover and many owners of such automobiles, particularly older models of such automobiles, find the installation of the snaps objectionable.

The prior art also provides other cover means for windshields and glass areas of the automobiles, including U.S. Pat. No. 2,599,066—Osbourn and U.S. Pat. No. 2,551,052—Quish, et al, which teaches a device to cover the glass area of an automobile utilizing suction cups to secure the cover to the glass.

As previously stated, no prior art device is known to cover an open area of an automobile, including "T" top automobiles, when the removable panels are out of place and when the automobile is parked. Particularly, no prior art device is known to provide a sealing arrangement to prevent leakage of water or other elements into the passenger compartment by providing a sealing strip adjacent the upstanding frame member of the "T" top and where the cover can be attached to such an automobile without any modification or addition to the frame of the automobile surrounding the "T" top.

SUMMARY OF THE INVENTION

The present invention provides a new and useful cover arrangement for use particularly in "T" top automobiles, or for that matter, any automobile which an open top passenger compartment is provided which has a ledge surrounding the open area. The cover provides an inexpensive seal arrangement to prevent leakage of water or other material into the passenger compartment through the seal.

Devices within the scope of the present invention can be installed without any modification to the automobile such as the use of snaps or other devices and the cover is easily and quickly removed when it is desired to utilize the automobile. It is equally easily and quickly replaced when the automobile is later parked.

More particularly the present invention provides a cover for the top of an automobile, having a front window, side windows, and a rear window surrounding a passenger compartment of the automobile and where the top of the automobile provides removable, self supporting covers carried by a frame assembly in the top of the automobile and where the edge of the frame adjoining the rear window of the automobile has a lip at the juncture between the removable covers and the frame where the cover provided by the present is a flexible sheet of material sized to cover the top of the automobile and the openings and includes a front flap at one edge of the cover to extend downwardly over the windshield, opposed side flaps to encroach over the side windows, and a rear edge carrying a flexible, compressible, generally circular cross section seal member, and strap means connected to the rear edge of the cover and extending outwardly therefrom and further where suction cup devices are provided on the side flaps to be secured to the side windows of the automobile, the front flap includes suction cup members to be secured to the windshield of the automobile and the straps include suction cups adjacent the terminal ends thereof to be secured to the rear window so that the cover can be pulled tightly toward the rear of the automobile to form a seal between the circular member and the ledge.

Various arrangements are available within the scope of the present invention and one such arrangement is illustrated in the accompanying figures where it is to be understood that the illustration presented is not by way of limitation.

BRIEF DESCRIPTION OF THE DRAWINGS

In the accompanying illustration of one example in accordance with the present invention.

DETAILED DESCRIPTION OF THE DRAWINGS

Figure 1:
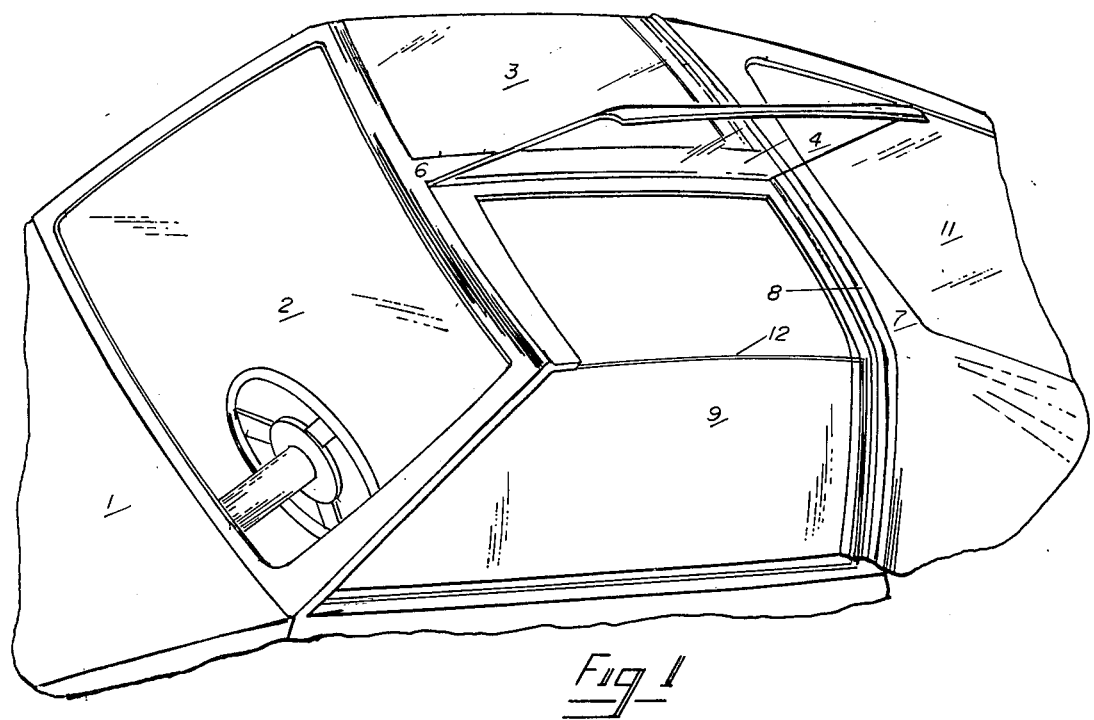
FIG. 1 is a perspective view of an automobile having a "T" top.

In FIG. 1 an automobile 1 is illustrated having a windshield 2, a side window 9, (where it is understood that a corresponding arrangement is provided on the opposite side of the automobile, not shown) and a rear window 8. A "T" assembly 6 is provided to receive panels 3 and 4 which can be of clear plastic or other decorative materials as is known in the art. The panels 3 and 4 are normally removed when the operator of the automobile desires an open atmosphere approximating the atmosphere provided by the convertible automobile as is known in the art. The "T" frame assembly 6 includes an upstanding ledge 8 at the rear of the passenger compartment which normally provides a seal between the rear edges of panels 3 and 4 and the continuation of the top of the automobile 7.

The area represented by the covers 3 and 4 is open when the automobile is not in use. Commonly, an automobile may be driven to work by the operator with the panels removed. If the weather is threatening or if the operator desires to protect the automobile from the effects of ultraviolet radiation during the day, it is necessary for the panels 3 and 4 to then be replaced prior to leaving the automobile. Such replacement is time consuming and inconvenient for many operators who find this replacement and removal at the beginning and termination of each trip objectionable. It is for this reason that the cover shown in FIG. 2 has been developed and can be provided to be easily and quickly removed and replaced upon the commencement of operation of the automobile and the termination of such operation.

Figure 2:
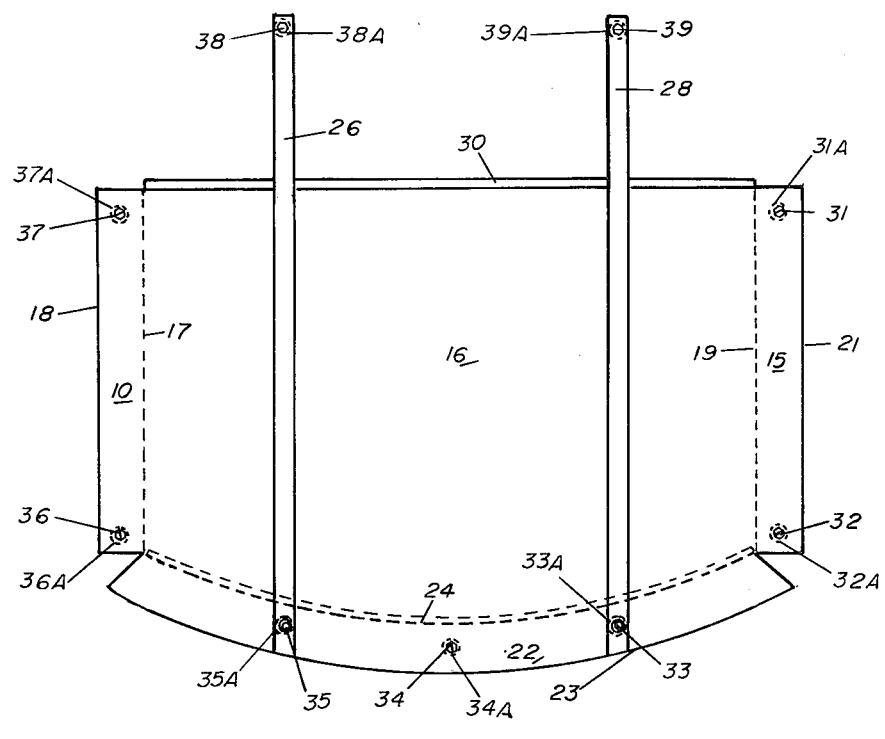
FIG. 2 is a plan view of a cover arrangement within the scope of the present invention for use in an automobile of the type shown in FIG. 1.

FIG. 2, is an illustration of one arrangement in accordance with the present invention a cover 16 with side flaps 10 and 15 where fold lines 17 and 19 are indicated opposite sides of the cover with flaps 10 and 15 respectively are provided outside the lines. The lines may or may not be visable but their location is determined by the relative positions of the upper surface 12 of window 9 and a similar upper surface provided by the window on the opposite side of the passenger compartment (not shown). In essence the line 17 and 19 locate the general area of abutment of the cover with the upper surfaces of the side windows. A front panel 22 is likewise provided, defined generally by the top front of the windshield where the front of the cover engages the front of the "T" assembly over the windshield and where panel 22 extends downwardly over the windshield.

In accordance with another feature of the present invention a generally circular cross section compressible seal member 24 can be provided, as shown, to be urged to sealing relation with the automobile top to prevent rain blowing under the top.

Figure 5:
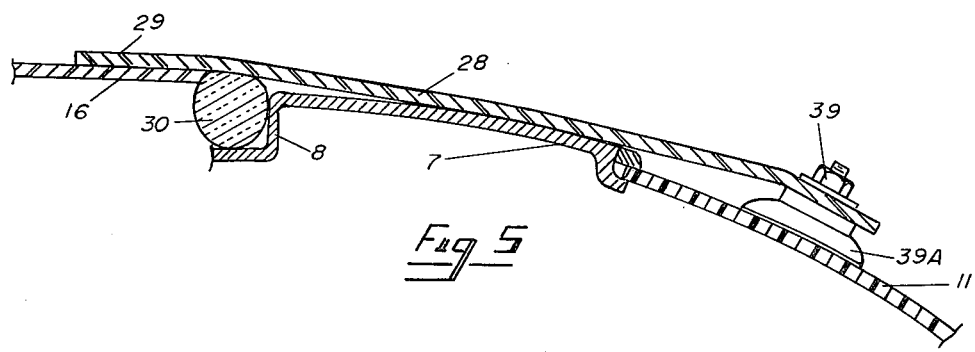
FIG. 5 is a cross-section view of a portion of the top shown in FIG. 2 in place on the automobile shown in FIG. 3.

On the rear edge of cover 16 a generally circular flexible, compressible seal member 30 is provided, as shown in detail in FIG. 5, which can, for example, be glued or stitched to the rear edge of cover 16 to engage lip 8 of the top as discussed hereinafter.

Straps 26, 28 are provided to extend outwardly from the rear edge of cover 16 and to extend downwardly over the rear window 11 of the automobile illustrated in FIGS. 2. In the arrangement shown, the straps extend the full length of the cover to provide additional support to hold the top up as described hereinafter.

Fastening means, for example suction cups 31A-39A, are provided on the opposite side of flaps 10, 15, 22 and straps 26, 28 as shown in FIG. 2 and secured in place by suitable means, for example bolts 31-39. As shown in FIG. 2 suction cups 33 and 35 are located in straps 26-28.

Figure 3:
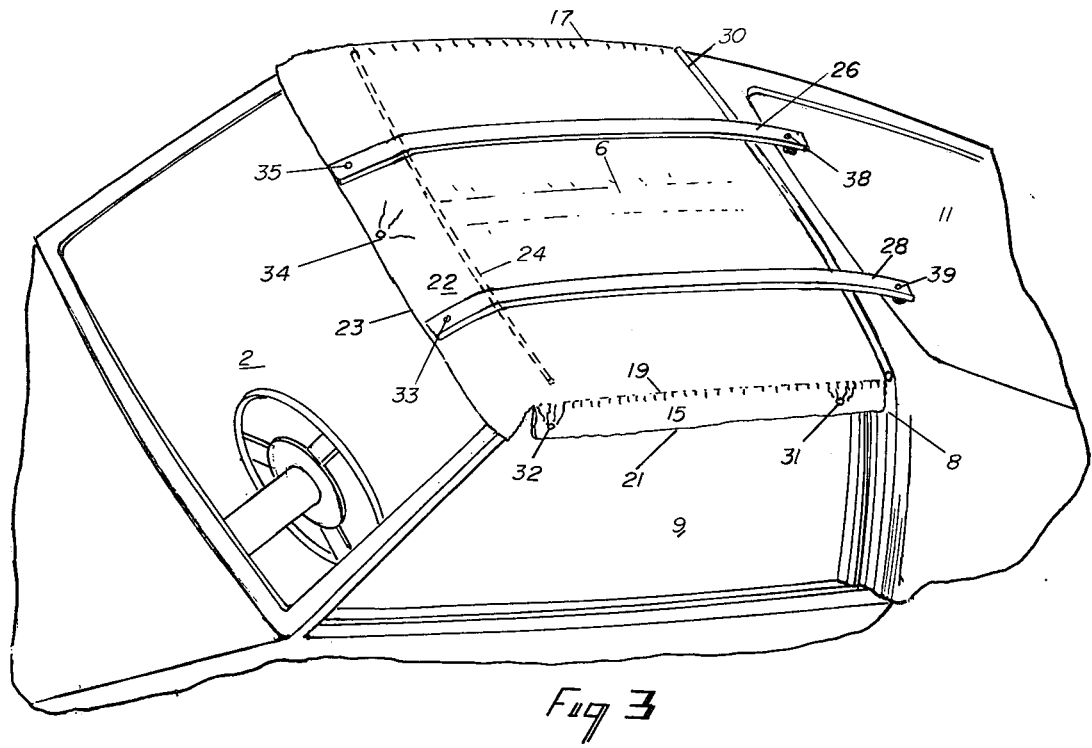
FIG. 3 is a perspective illustration of the automobile in FIG. 1 with the top of FIG. 2 in place.

FIG. 3 is an illustration of the device shown in FIG. 2 in place on the automobile of FIG. 1 where flap 22 is located down over windshield 2 with suction cups 33A, 34A, 35A secured to the windshield and with flap 15 extending downwardly over window 9 with suction cups 31A, 32A secured to the side window. It will be understood that a like arrangement is provided for the opposite side where flap 10 is secured to the opposite window by means of suction cups 36A, 37A. It will be further noted that the seal 24 is located above the front edge of the "T" frame assembly and that the line 19 is located approximately at the location of the upper edge 12 of window 9. In accordance with the present invention the device is installed with straps 26, 28 extending over the rear 7 of the frame assembly and with the sealing strip 30 in accordance with the present invention abutting in sealing relation with the ledge 8 provided by frame 7. Also, seal 24 is located to be urged to sealing realtion with the auto top when straps 26, 28 are pulled tight. Straps 26 and 28 are secured to window 11 by means of suction cups 38A, 39A to hold the compressable seal 30 in compressed condition against lip 8 as illustrated in FIG. 5. Referring to FIG. 5 the general configuration of the sealing strip 30 is shown along with the orientation of the cover 16 and the strap 28 which is, for example, stitched to cover 16 at location 29. Suction cup 39A is shown to adhere to rear window 11 with the strap 28 taut to hold the sealing strip 30 in the desired compressed condition against ledge 8.

Figure 4:
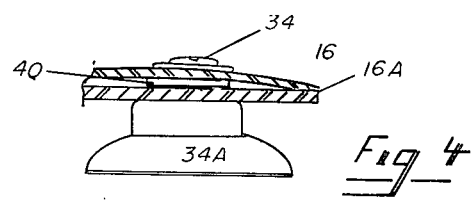
FIG. 4 is a cross-section view of a fastening device within the scope of the present invention.

FIG. 4 is an illustration of a typical cross section illustrating the relative position of the suction cup, in this case suction cup 34A with respect to the cover flaps. It will be seen that the cover can include overlying layers 16-16A with a rigid reinforcement 40 located therebetween, where bolt 34 is shown extending through the covers 16, 16A and reinforcement 40 to secure suction cup 34A to the flap.

It will be understood that the foregoing is but one arrangement within the scope of the present invention and that various other arrangements also within the scope of the present invention will occur to those skilled in the art upon reading the disclosure set forth hereinbefore.

The invention claimed is:

1. A cover for the top of an automobile, having a front window, opposed side windows, and a rear window, surrounding a passenger compartment of the automobile, where the top of the automobile provides removable, self supporting panels carried by a frame assembly in the top of the automobile above the passenger compartment where the edge of the frame adjoining the rear window of the automobile has a ledge to provide a joint between the removable covers, the frame supporting the removable covers, where the cover includes: a flexible sheet of material sized to cover the top of the automobile and includes front flap means located adjacent a front edge of said cover to extend downwardly over the windshield, opposed side flaps to encroach over the side windows, a rear edge carrying a flexible, compressible, generally circular cross section seal member, and strap means connected to the rear edge of the cover and extending outwardly therefrom, and suction cup means on the side flaps to be secured to the side windows of the automobile, on the front flap to be secured to the windshield of the automobile and on the straps adjacent the terminal ends thereof to be secured to the rear window so that the cover can be pulled tightly toward the rear of the automobile to urge the circular member to sealing relation with the ledge.

2. The invention of claim 1 including second elongate compressible seal member extending along a portion of said front edge of said cover to be urged to sealing relation with said top of said automobile when said cover is in place on said automobile.

3. The invention of claim 1 wherein said strap means extend outwardly from said rear edge of said cover and are connected to said cover and extend throughout the length thereof to said front flap.

4. The invention of claim 3 wherein said suction cups carried by said front flap are also connected to the portion of said strap means extending over said front flap.

* * * * *